Dec. 26, 1922.
J. STARKWEATHER.
ANTISKID OR MUD CHAIN.
FILED JAN. 4, 1922.
1,439,922
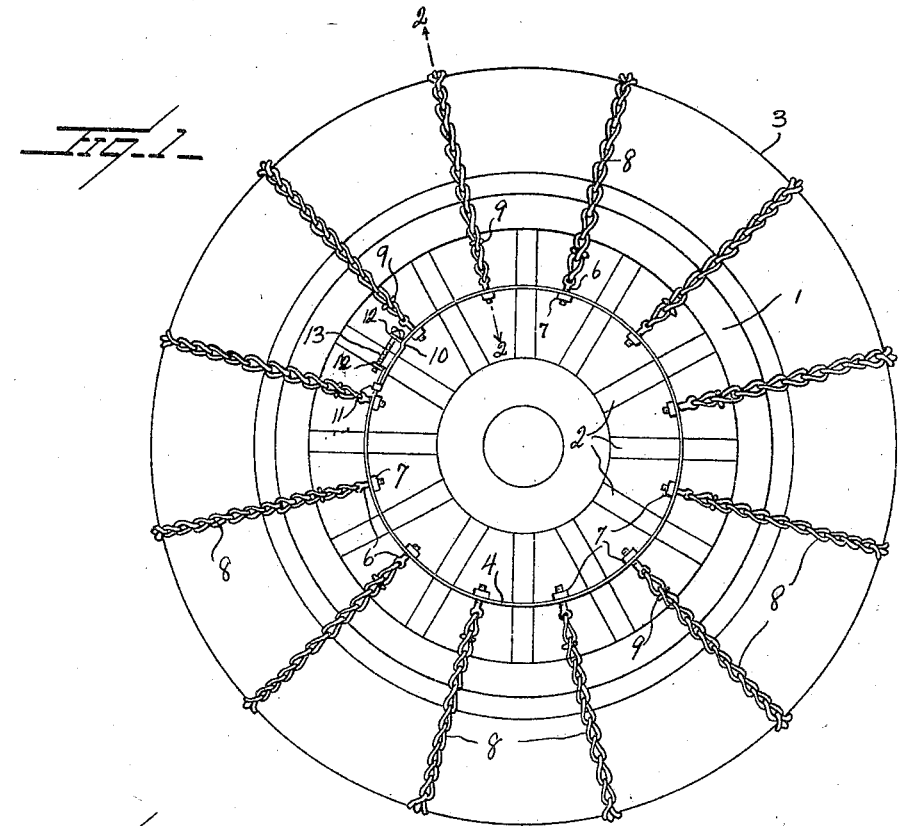
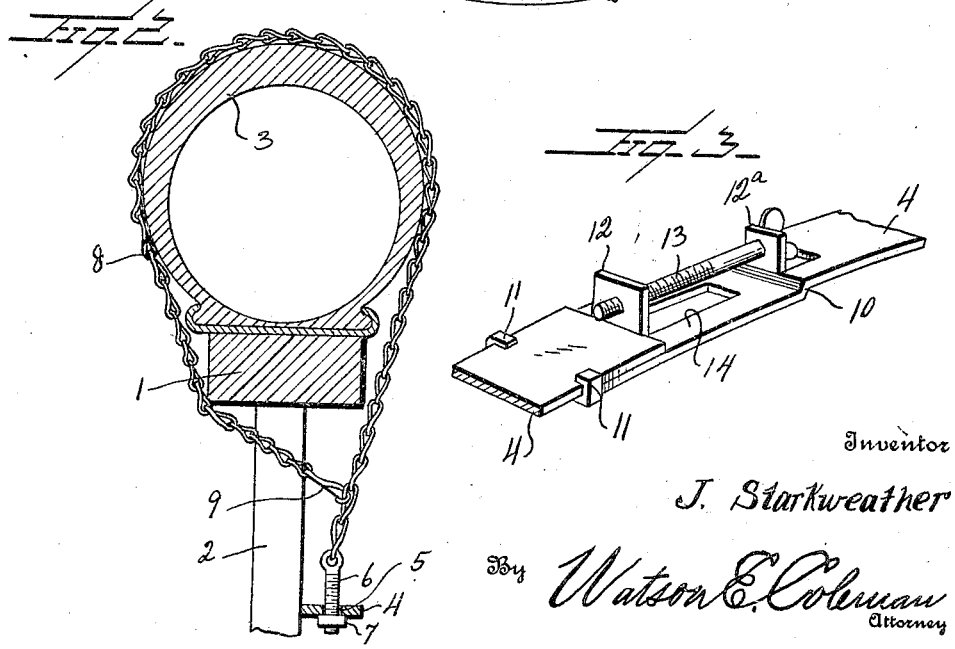
Inventor
J. Starkweather
By Watson E. Coleman
Attorney Patented Dec. 26, 1922.

1,439,922

UNITED STATES PATENT OFFICE.

JOHN STARKWEATHER, OF OTTAWA, KANSAS.

ANTISKID OR MUD CHAIN.

Application filed January 4, 1922. Serial No. 526,916.

*To all whom it may concern:*

Be it known that I, JOHN STARKWEATHER, a citizen of the United States, residing at Ottawa, in the county of Franklin and State of Kansas, have invented certain new and useful Improvements in Antiskid or Mud Chains, of which the following is a specification, reference being had to the accompanying drawings.

Heretofore devices of this character have been made so that certain chains thread or interengage with other chains, which have been found to produce a very complicated construction, and one which is not only difficult to apply, but also one which becomes tangled, when not applied to a wheel. Furthermore in devices of this character the transverse chains have to be individually tightened.

It is therefore, the purpose of the present invention to provide an anti-skid or mud chain, which not only eliminates the foregoing disadvantages, but involves a construction enabling the anti-skid or mud chain to be very easily and quickly applied, and in such wise that the transverse chains which pass over the tire can be adjusted simultaneously, in order to fit the tire snugly, in order to prevent the tire from skidding.

However, while the transverse loop chains, which are radially arranged are adjusted simultaneously, it is also possible to adjust them individually.

Still another purpose is the provision of a non-skid or mud device for automobiles including a plurality of chains extending from an adjusting band at the side of the wheel and formed in loops to extend transversely over the tire, so that their ends may be connected to any one of the links of the chains adjustably, in combination with means connecting the ends of the band, whereby all the chains may be adjusted at one time, after the loops have been disposed in position on the tire.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in side elevation of an automobile wheel, showing the improved anti-skid or mud chain as applied;

Figure 2 is a transverse sectional view on line 2—2 of Figure 1, showing how the radial chains are looped around the tire;

Figure 3 is an enlarged detail perspective view of the adjustable connected ends of a band 4, which is disposed at the side of the wheel.

Referring to the drawings, 1 designates the felly of the wheel, 2 the spokes, which radiate from the hub of the wheel, and 3 the tire. Disposed adjacent the side of the spokes of the wheel is an adjusting band 4, which is provided with a plurality of openings or perforations 5, through which the eye-bolts 6 protrude. These eye-bolts are provided with nuts 7, for the purpose of adjusting them radially through the band. Connected to the eye-bolts are antiskid or mud chains 8, which as shown in Figure 1 are disposed radially. One end of each chain 8 has a snap hook 9. Obviously the chains 8 in passing about the tire and the felly can be lengthened or shortened, by simply adjusting the snap hook 9 in any one of the links of the body of the chain.

Obviously by adjusting the nuts 7, the eye-bolts 6 can be adjusted radially through the band 4, so that the chains 8 may be tightened or loosened individually.

One end of the band 4 is provided with a bend as at 10, thereby causing to be formed an offset portion 14, which underlaps the opposite end of the band. The edges of the offset portion 14 adjacent its extremity are provided with lugs 11 which extend radially and are angular as shown, so as to overlie the opposite edges of the opposite end of the band, whereby the opposite end of the band may adjust itself between the lugs, when the band is expanded or contracted.

The end of the band which is guided under the lugs 11 is provided with an upstanding ear 12, while the other end of the band has an ear 12ª struck up from the band adjacent the bend 10. A thumb screw 13 loosely engages through the ear 12ª, and is threaded into the ear 12. Obviously by adjusting the thumb screw 13 the overlapped ends of the band 4 may be adjusted toward and from each other, so as to contract or expand the band to any diameter. The offset portion 14 of the band is provided with a slot 14$^a$ to receive one of the nuts 7 of an eye-bolt, which is adjacent the adjustable connection between the ends of the band, so as to permit the band to have a wide range of adjustment.

The anti-skid or mud chain of the present character may be applied to wheels of different diameters, due to the fact that the chains 8 may be of substantial length, to pass about all the tires now in use. Also by adjusting the snap hook 9 in engagement with the links of the bodies of said chains 8, they may be adjusted relatively to the tire. Furthermore the chains 8 may be individually adjusted by the nuts 7. After the anti-skid or mud chain is applied, and a reasonable adjustment given the chains 8, to correspond with the wheel, with which the device is constantly used, the band 4 may be contracted or increased in diameter, by adjusting the thumb screw 13 in one direction or the other, and by so doing the radial chains 8 may be adjusted, tightened or loosened radially, in order to prevent them from slipping.

The invention having been set forth, what is claimed is:—

In an anti-skid or mud chain, the combination with a band adapted for disposition adjacent the outside of the wheel, a plurality of radial chains connected to the band, and provided with adjustable loops engaging about the tire of the wheel transversely, said band having separable overlapping ends, and means adjustably connecting said overlapping ends for contracting or increasing the diameter of the band, whereby said chains may be loosened or tightened radially.

In testimony whereof I hereunto affix my signature.

JOHN STARKWEATHER.